(12) United States Patent
Paul et al.

(10) Patent No.: US 7,910,510 B2
(45) Date of Patent: Mar. 22, 2011

(54) CERAMIC DIELECTRIC OR THIN AND/OR THICK LAYERS CONTAINING AT LEAST ONE CERAMIC DIELECTRIC METHOD FOR PRODUCTION AND USE THEREOF

(75) Inventors: Florian Paul, Kandern Wollbach (DE); Jürgen Hausselt, Germersheim (DE); Joachim Binder, Karlsruhe (DE); Hans-Joachim Ritzhaupt-Kleissl, Walldorf (DE); Andre Giere, Frankfurt (DE); Patrick Scheele, München (DE); Rolf Jakoby, Rosbach (DE)

(73) Assignee: Forschungszentrum Karlsruhe GmbH, Karlsruhe (DE)

( * ) Notice: Subject to any disclaimer, the term of this patent is extended or adjusted under 35 U.S.C. 154(b) by 148 days.

(21) Appl. No.: 12/226,393

(22) PCT Filed: Apr. 16, 2007

(86) PCT No.: PCT/EP2007/053685
§ 371 (c)(1),
(2), (4) Date: Dec. 16, 2008

(87) PCT Pub. No.: WO2007/118872
PCT Pub. Date: Oct. 25, 2007

(65) Prior Publication Data
US 2009/0297804 A1    Dec. 3, 2009

(30) Foreign Application Priority Data

Apr. 18, 2006 (DE) .......................... 10 2006 017 902

(51) Int. Cl.
*C04B 35/468* (2006.01)
*C04B 35/553* (2006.01)
*B05D 1/00* (2006.01)
*C23C 14/08* (2006.01)

(52) U.S. Cl. ........ 501/137; 501/138; 501/139; 501/151; 428/210; 427/162.2; 427/376.2; 204/192.22

(58) Field of Classification Search .......... 501/136–139, 501/151; 428/210; 427/126.2, 376.2; 204/192.22
See application file for complete search history.

(56) References Cited

U.S. PATENT DOCUMENTS

| 3,111,414 A | 11/1963 | Buessem et al. |
| 4,870,539 A * | 9/1989 | Chance et al. ............. 361/321.5 |
| 5,039,637 A * | 8/1991 | Hyuga et al. ................. 501/135 |
| 5,427,988 A | 6/1995 | Sengupta et al. |
| 5,635,434 A | 6/1997 | Sengupta |

FOREIGN PATENT DOCUMENTS

| DE | 102 25 972 | 3/2004 |
| DE | 103 50 788 | 2/2005 |
| EP | 0 378 989 | 7/1990 |

OTHER PUBLICATIONS

WPI-Abstract JP 12-94 304A, Thomson, 1990.
Detalle et al: "Electrical Property Evaluation of . . . ", Journal of Applied Physics, BD. 100, No. 9, Nov. 2, 2006, XP012090459.
Meyar et al: "Multifunctional Ceramics BAL-xSrx . . . ", BD. 27, No. 2-3, Nov. 19, 2006, XP005729714.
Horng et al: "Ion-Implanted Treatment of . . . ", Journal of Non-Crystalline, BD. 280, No. 1-3, Feb. 2001, pp. 48-53, XP004229703.
Zhang et al: "Fabrication and Electrical Properties . . . ", Journal of Materials Science, BD. No. 19, Oct. 1, 2002, pp. 4155-4158, XP001130051.
Nekrasov et al. In Inorganic Materials, 1970, vol. 6, pp. 1907-1909.
Eyraud et al. In Ferroelectrics, 1996, vol. 175, pp. 241-250.
Hoh et al. In Journal of the American Ceramic Society vol. 46, No. 11, pp. 516-518, Nov. 1963.
Florian S. Paul, With the Title "Fluoridation of Barium Titanate ($BATIO_3$) Ceramics", Manchester Materials Science Centre.
Fujihara et al. Applied Surface Science 221 (2004) 178-183.
Makovec et al., Journal of the American Ceramic Society 86 [3] 495-500 (2003).
Fluka/Riedel-De Haën Laboratory Chemicals Catalog 2001/2002.

* cited by examiner

*Primary Examiner* — Karl E Group
(74) *Attorney, Agent, or Firm* — Lucas & Mercanti, LLP; Klaus P. Stoffel

(57) ABSTRACT

The present invention relates to dielectric ceramics, thin and/or thick layers produced therefrom and a method for the production thereof and the use of the dielectrics and of the thin and/or thick layers.

21 Claims, 2 Drawing Sheets

CERAMIC DIELECTRIC OR THIN AND/OR THICK LAYERS CONTAINING AT LEAST ONE CERAMIC DIELECTRIC METHOD FOR PRODUCTION AND USE THEREOF

This application claims the priority of DE 10 2006 017 902.1.

The present invention relates to the field of controllable microwave dielectrics and components based thereon and circuits based on ceramics (ferroelectrics) having small dielectric losses and high controllability (ratio of change in permittivity in the controlled state (with E field) to permittivity in the uncontrolled state (without E field)), i.e. having a high quality.

The present invention also relates to ceramic dielectrics, thin and/or thick layers produced therefrom, for example screen printed thick layers, the use of the ceramic dielectrics and of the thin and/or thick layers, and methods for the production thereof.

DEFINITIONS

In the context of the present invention, all quantity data are to be understood as meaning weight data, unless stated otherwise.

Unless stated otherwise, the reactions or method steps mentioned are carried out at atmospheric pressure.

In the context of the present invention, a thin layer is understood as meaning a layer having a thickness of less than 1 µm, preferably from 0.001 to 0.99 µm, particularly preferably from 0.05 to 0.5 µm.

In the context of the present invention, a thick layer is understood as meaning a layer having a thickness greater than or equal to 1 µm, preferably a layer thickness from 1 to 100 µm, particularly preferably from 2 to 50 and especially preferably from 2 to 20 µm.

In the context of the present invention, a sol is understood as meaning a colloidal solution in which a solid or liquid substance is dispersed in very fine distribution in a solid, liquid or gaseous medium (also see the relevant technical literature, e.g. Römpp Chemie Lexikon [Römpp Lexicon of Chemistry]).

In the context of the present invention, HF range is understood as meaning the high frequency range from 100 MHz to 100 GHz, in particular from 100 MHz to 50 GHz or from 100 MHz to 40 GHz.

In the context of the present invention, homogeneous distribution of elements is understood as meaning that the elements are mixed uniformly with one another, i.e. that substantially a random distribution of the elements is present without regions having accumulations of an individual element. Accordingly, there is an equal distribution of the elements in the corresponding particles which does not change in different regions of the particles, i.e. no concentration gradients of the elements within the respective particles.

BACKGROUND OF THE INVENTION

Tailor-made ceramics are becoming increasingly important in industry. In many technical areas, ceramics optimized to the specific requirements are key materials without which many technologies would not be technically feasible. Modern high-performance ceramics therefore also differ fundamentally in their properties from the generally known, classical ceramics. Like these, they consist of nonmetallic, inorganic materials. However, they are produced synthetically under clean and controlled conditions and they acquire their specific properties only as a result of this.

In general, technical ceramics can be divided into two large groups. Firstly, these are the structural ceramics which are designed in principle to retain their shape and structure even under strong mechanical, biological, chemical or thermal load. The other subgroup comprises the functional ceramics. They have special properties. These properties are, for example, optical, electrical, dielectric and magnetic functions.

The material class consisting of the functional ceramics, in particular those having dielectric properties, occupies a special position. It has made a decisive contribution to the development of our industrial society through the varied properties of its materials. Functional ceramics have become extremely important owing to the rapid proliferation of microelectronics in recent years.

Electronic circuits now no longer manage without the implementation of dielectric functional ceramics. The efficiency of electronic circuits depends to a high degree on the efficiency of the dielectric ceramics used.

In particular, high-frequency applications in communication and sensor systems and in wireless data transmission require high-quality dielectric materials. Applications may be, for example, control systems of radar antennas with electronically controllable beam sweep. These use so-called phase shifters which make the radiation direction of phased array antennas electronically controllable. However, tunable high-frequency filters, modulators, amplifiers and oscillators are also possible for applications in mobile radio (GSM, UMTS, Bluetooth, W-LAN, etc.). Moreover, varied applications in contactless sensor technology are possible (e.g. RFID (radio frequency identification) applications). In said commercial applications, the materials used must additionally be economical, i.e. competitive in price compared with semiconductor components.

The quality and price requirements with regard to dielectric high-frequency materials are high.

In addition, the flexibility and mobility requirements with regard to the communication sensor systems are increasing. This results in the requirement for economical and dynamically reconfigurable high-frequency or microwave modules.

The demand for such controllable microwave components will increase in the years ahead.

However, a precondition for this is the provision of economical, controllable components which in turn depends directly on the quality and availability of the controllable, dielectric materials required for this purpose.

Possible materials for this purpose are the dielectric functional ceramics. In particular, ferroelectric oxide ceramics are suitable for these applications. They show a nonlinear dependency of the permittivity (relative permittivity) on the electric field strength, which is referred to as controllability. This effect can be brought about in them virtually without power with very short response times and with simultaneous transmission of higher-frequency powers. In addition, ceramic layers offer the possibility of planar system integration in order to meet the space requirements of microelectronics. In contrast, phase shifters based on coils having ferrite cores and based on PIN diodes have not become established owing to insufficiently fast response times and excessively large dielectric losses and a lack of planar integratability. The good planar integratability is made possible by use of the planar shaping methods for thin and thick layers such as, for example, chemical deposition methods (chemical solution deposition (CSD), chemical vapor deposition (CVD)) and physical gas deposition methods (physical vapor deposition (PVD)) for the thin layer production and ceramic screen printing or ceramic film casting for the thick layer production.

Among the ferroelectric oxide ceramics, inter alia the mixed oxide systems barium strontium titanate ($Ba_{1-x}Sr_x$-$T_iO_3$, BST), barium strontium zirconate titanate ($Ba_{1-x}S$-$r_xZr_yTi_{1-y}O_3$, BZT) and the silver tantalate niobate (Ag-$Ta_xNb_{1-x}O_3$, ATN) system have already been tested with regard to their fundamental suitability as controllable dielectrics. Their dielectric properties were investigated using solid ceramic bodies, thick ceramic layers and thin layers. Said work on the thick and thin layers is, however, limited substantially to questions relating to measurement.

The BST system proved to be the most promising one.

However, the commercially available controllable components are based on thin BST layers which are produced by means of gas-phase deposition and have the disadvantage that their production is very complicated. In addition, the difficulty in establishing a defined stoichiometry in the production of thin layers is disadvantageous. Furthermore, the dielectric properties of thin layers are subject to a strong influence of internal stresses and of lattice parameter differences relative to the substrate. Thus, high lattice stresses due to differences in the coefficients of thermal expansion as well as the lattice parameters of layer and substrate can lead to reduced permittivity and controllability. In order to make this controllable or to minimize it, expensive single-crystal substrates are often used as substrates for thin layers or additional buffer layers are applied between substrate and layer, which gives rise to additional processing costs.

In contrast, components which are based on thick ceramic layers as functional layer have the advantage that their properties are determined virtually solely by the properties of the ceramic powders used and not by the substrate. Moreover, they can be produced economically and in large quantities via the screen printing technology already established in electronics. Moreover, it is possible to use more economical, polycrystalline substrates since a polycrystalline layer without preferred crystallographic orientation or epitaxy is in any case applied thereby. In principle, thick layers can be integrated on LTCC substrates (low temperature cofired ceramics) by the screen printing technique, which thick layers are being increasingly used in mobile radio technology and automotive electronics.

In comparison with thin BST layers, however, thick BST layers have to date shown, at frequencies above 5 GHZ, very greatly increased dielectric losses which additionally increase much more strongly than those of the thin layers at higher frequencies.

A small particle size leads firstly to reduced permittivities and secondly to an increasingly diffuse phase transition of the ferroelectric-paraelectric phase transformation at the Curie point. This has the positive secondary effect that the thermal stability of the permittivity is increased thereby.

In addition to said factors influencing the dielectric properties, deviations from the stoichiometric composition and impurities can also influence these significantly. They can in certain circumstances lead to a strong shift in the Curie point, to flattening of the permittivity curve or to reduction of the dielectric losses.

Small amounts of foreign ions, so-called dopants, are therefore often added to the ceramic in order to influence the properties in a targeted manner. In the literature, descriptions of thick BST and BT layers have to date been limited to undoped thick layers. Accordingly, it is not known how dopants affect the HF losses in thick BST layers.

Endo et al. in Journal of Materials Science 25 (1990) 619-623 and Nekrasov et al. in Inorganic Materials, 1970, Vol. 6, pages 1907 to 1909, disclose the fluoridation of undoped barium titanate (BT). The fluoridation is not thermally stable, which means that the material cannot be sintered.

Acceptor-fluoride-codoped PZT for US converters is disclosed by Eyraud et al. in Ferroelectrics, 1996, Vol. 175, pages 241-250. Applications as controllable dielectric for microwave frequencies are not mentioned.

The fluoridation of BT via the gas phase is disclosed in U.S. Pat. No. 3,111,414 but the production of fluoridated BT with metallic codoping is not possible according to this patent. There is just as little indication of controllable behavior and virtually no data on dielectric properties.

Hoh et al. in Journal of The American Ceramic Society Vol. 46, No. 11, pages 516-518 disclose Cr—F-codoped BT and the production of doped BT from $Cr_2O_3$ and $CrF_2$ but give no information as to which composition finally prevails in the sample (F can become volatile as HF gas during production/sintering under humid air).

The fluoridation of BT via the mixed oxide route is disclosed in the master's work of Florian S. Paul, with the title "Fluoridation of Barium Titanate ($BaTiO_3$) Ceramics", Manchester Materials Science Centre, University of Manchester and UMIST. However, merely low-frequency properties of Mn—F- and Co—F-codoped BT are discussed there without any indication of the high-frequency/microwave properties and controllable behavior being given.

The separation of $BaF_2$ during the sintering of BT without acceptor doping is described by Fujihara et al. Applied Surface Science 221 (2004) 178-183. There too, there is no information about controllable properties.

The doping with fluorine is also disclosed by Makovec et al., Journal of The American Ceramic Society 86 [3] 495-500 (2003). However, large losses at 1 kHz are also described there and there is no information regarding dielectric properties, only resistance measurements being mentioned.

All HF investigations on thick layers have to date been unsatisfactory. Thick layers have to date shown extremely large losses in the HF range. Thin layers have to date been substantially better but firstly they are also substantially more expensive to produce than thick layers and secondly they too show relatively large dielectric losses in the HF range so that they cannot be used commercially at present.

Conclusions about the HF behavior from the low-frequency behavior are not possible or not possible in a satisfactory way since in particular the losses in the HF range are orders of magnitude higher than in the NF range.

Finally, U.S. Pat. No. 5,427,988 and U.S. Pat. No. 5,635,434 disclose BST for ferroelectric composites, but exclusively in combination with magnesium compounds.

OBJECT OF THE PRESENT INVENTION

Starting from the prior art to date, it was accordingly an object of the present invention to provide novel ceramic dielectrics which have properties which are advantageous compared with those of the prior art.

Furthermore, it was an object of the present invention to provide a reliable synthetic method for ceramic dielectrics, in particular for doped BST powders, and for thin and/or thick layers thereof.

It was also an object of the present invention to provide readily characterizable, stable and reproducible thin and/or thick layers.

It was a further object of the present invention to provide thin and/or thick layers based on the ceramic BST system, in particular screen printed thick layers (in the undoped as well as doped state) for use as electronically controllable functional layers in the frequency range from 10 kHz to 500 GHz or above, preferably at from 100 MHz to 100 GHz, in particular up to about 40 GHz.

DESCRIPTION OF THE INVENTION

Figure 1:
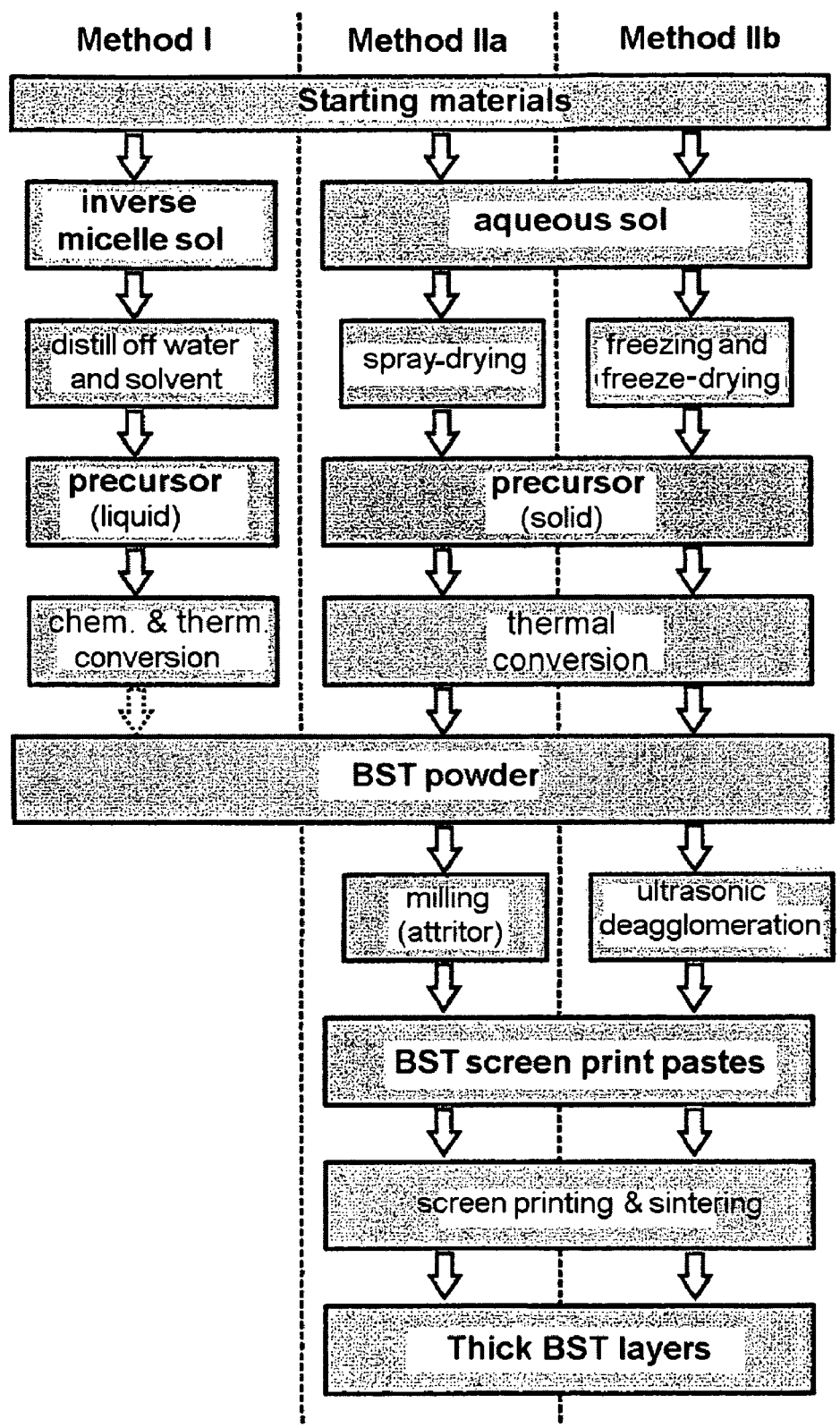
FIG. 1: is a flow chart showing the inventive method

In the present invention, two different wet chemical synthesis routes for $Ba_{1-x}Sr_xTiO_3$ production are used, which proceed not via a coarse mixture or precipitate but via routes closely related to sol-gel methods. Both methods start from solutions and can thus guarantee a homogeneous distribution of the participating elements at the molecular level with a high degree of conformity to stoichiometry, which cannot be achieved by the mixed oxide and coprecipitation methods.

This is on the one hand a route which is based on inverse micelles and starts exclusively from alcoholates as starting materials.

On the other hand, it is a synthesis route which is based on a sol drying method. This route starts from the Ba and Sr acetates and Ti isopropanolate as starting substances.

Of these two routes, the synthesis route which is based on a sol drying method is preferred according to the invention. The present invention also comprises the route via inverse micelles but said route is less preferred for the production of thick layers.

These two routes provide flexible routes which permits the reliable production of differently doped BST powders independently of the chemistry of the available compounds of the doping elements. On the other hand, these routes make it possible to produce BST particles in the nanometer range which are as small as possible.

In the present invention, it is possible to use both starting materials having technical-grade purity and starting materials having analytical purity. In a preferred embodiment of the present invention, the starting materials having analytical purity are used in order to minimize the influence of impurities on the products.

The purity of the chemicals, both technical-grade purity and analytical-grade purity, varies depending on manufacturer and production process of the relevant substances.

Accordingly, in the present invention, chemicals whose purity is purum (>97%), particularly preferably puriss. (>99%) and in particular puriss. plus (>99.5%), as defined, for example, on page 6 of the Fluka/Riedel-de Haën Laboratory Chemicals Catalog 2001/2002, are preferably used.

As high a purity as possible is preferred.

The purity most preferred according to the invention corresponds to a measurement-related purity, i.e. a purity at which the impurities are below the limit of detection of the measurement method.

If appropriate, the chemicals obtained can also be subjected to subsequent purification.

The production process according to the invention for multilayer structures comprising screen printed thick layers can accordingly be divided into six steps:
1) production of a sol,
2) production of a precursor via
   a1) the inverse micelle route or
   a2) the sol-gel route
   b) drying of the sol
3) production of a ceramic powder by means of calcination of the precursor,
   3).1 if appropriate, ultrasonic deagglomeration or milling of the ceramic powder,
4) production of the screen print paste by mixing of the constituents,
5) application of the screen print paste to a substrate by means of screen printing,
6) sintering of the thick layers.

In the context of the present invention, the term sol-gel route is used synonymously with the term sol drying route or sol drying method.

FIG. 1 schematically shows a section of the production method according to the invention with regard to thick layers, the inverse micelle route and the sol drying route being shown side by side. The thin layers which the present invention likewise comprises are not shown in FIG. 1.

As an alternative to the thick layers just mentioned, so-called CSD (chemical solution deposition) thin layers can also be produced starting from the sols described by applying the sols via
   a) dipcoating,
   b) spincoating or
   c) inkjet printing
as a thin layer to a substrate and producing thin BST layers directly by drying, calcination and/or sintering.

Accordingly, the present invention also comprises a method for the production of multilayer structures comprising thin layers.

The layer thickness can be varied by the viscosity of the sol and the ceramic yield of the sol or via multiple coatings.

It is possible to apply different layers one on top of the other.
   a) In the dipcoating method, the substrate is immersed in a sol and drawn out again at constant speed. Owing to the large surface areas of the substrate, the solvent is easily released and the liquid film hardens to give a solid gel layer. The oxidic thin layer is obtained by thermal treatment.
   b) The spincoating method is based on the equilibrium between the centrifugal force and the viscosity of sol/solution. The spincoating method can be divided into four stages: deposition, spin-up, spin-off and evaporation. The method is suitable for planar surfaces and an approximately uniformly thick film is obtained on the substrate. The spin-off phase is primarily responsible for the layer thickness.
   c) In inkjet printing, the sol, structured via a printer head, can be applied to a substrate by printing BST sol droplets onto the substrate in a targeted manner.

These three methods are known to the person skilled in the art and therefore need not be described in more detail here.

It is also possible, but less preferred according to the invention, to produce the thin layers by chemical vapor deposition (CVD) and/or physical gas deposition methods (physical vapor deposition (PVD)).

According to the invention, both the sol synthesis via inverse micelles (method I) and the sol synthesis via the sol-gel route (methods IIa and IIb) start from a solution of the starting materials.

In both processes, this is converted into a sol as an intermediate.

The sol synthesis is followed by the production of the powders, the screen print pastes and the ceramic thick layers or the production of the thin layers via sols.

The starting compounds in the inverse micelle route are produced in a preferred variant beforehand from the metals by reaction with isopropanol (2-propanol).

In the sol drying method, a solution in acetic acid is produced from the starting materials.

The sol obtained therefrom is then converted via spray-drying (method IIa) or spray-freeze granulation and freeze-drying (method IIb) with subsequent calcination into a ceramic powder or, for example, fed as a sol to a thin layer method such as, for example, wet chemical deposition, CSD.

The resulting ceramic powder is then further used for the production of screen print pastes, preferably for the production of screen print pastes based on hydrophobic, organic solvents (terpineol).

The ceramic powders obtained are preferably further processed to give screen print pastes having a solids content of about 17% by volume.

From this in turn, thick layers are then applied to a substrate by screen printing. This is preferably effected by semiautomatic screen printing.

Possible substrates are in principle all substrates which withstand a temperature of 800° C. or more. Alumina layers are preferred, polycrystalline $Al_2O_3$ substrates being particularly preferred.

The fine-scale ceramic starting powders are preferably produced according to the invention via the sol drying route by freeze-drying. This route is extremely flexible with regard to the powder stoichiometries which can be produced. The resulting powders are present in crystalline form from 700° C. and are in the form of hard agglomerates having a mean primary particle size of about 40 nm. They can be broken down by means of ultrasound to agglomerate sizes in the nm range.

The thick layers produced according to the invention preferably have porosities in the range from about 20 to 40%. Furthermore, the thick layers produced according to the invention are preferably finely divided. Here, finely divided means that the particle sizes are in the range from 20 to 1000 nm, preferably from 100 to 800 nm and particularly preferably from 270 to 520 nm.

According to the invention, the production of the thick layers can be varied in different ways, it being preferred according to the invention to effect variation by an increased calcination temperature or by microwave sintering.

In a variant preferred according to the invention, the thin and/or thick layers have as low a residual moisture content as possible, i.e. the residual content of water is below 10% by weight, preferably below 5% by weight, more preferably below 3% by weight, based in each case on the total mass of the thick layers; particularly preferably, they are completely anhydrous, i.e. the residual amount of water is below the limit of detection of the method of measurement.

In order to prevent the thin and/or thick layers from absorbing or adsorbing water, they can be produced in a preferred development form under an inert atmosphere, in particular a dry nitrogen atmosphere, and then, if appropriate, sealed with a suitable resin customary in the prior art.

The methods described are very preferably carried out in association with the ceramic dielectrics according to the invention which are based on the system $Ba_{1-x}Sr_xTi_{1-y}Me_yO_{3-z}F_z$, where
x=0.0001 to 1, preferably 0.2 to 0.6 and
y=0.0001 to 0.2, preferably 0.001 to 0.05, and
z=0.00001 to 3, preferably 0.001 to 0.2.

In a preferred development form, the dielectrics of the present invention are acceptor-doped.

The dielectrics according to the invention which are obtained in this manner have a substantial and selectively increased permittivity and, in the NF range, also a substantial and selectively increased controllability.

A doping preferred according to the invention is the Fe acceptor fluoride codoping of BST, which reduces the dielectric losses and significantly increases the qualities, especially in the low GHz range, i.e. in the range of about 0.1 to 50 GHz, in particular below 20 GHz, i.e. from 0.1 to 20 GHz.

An iron or other acceptor doping drastically reduces the dielectric losses and the dependence of the losses on the control field, especially in the HF range.

Fluoridation increases the permittivity and also the controllability, with simultaneous further reduction of the losses.

As a result of the greatly reduced losses and increased controllability, the qualities increase sharply, particularly in the frequency range from 5 to 0.1 GHz.

Fluorine has an ionic radius ($F^-$, coordination number 6) which is very similar to that of oxygen ($O^{2-}$, coordination number 6). Fluorine is therefore particularly suitable for occupying oxygen sites in the dielectric (BST).

Further possible acceptor dopants are Co, Mn, Ni, Cu, Mg, Cr, Zn, Cd, Ag, Pt, Au, Y, Sc, Al, Ga, In, As, Sb, preferably Co, Mn, Ni, Cu, Mg, Cr.

The titanium ion can, however, be substituted not only by the doping elements mentioned but also by the isovalent element zirconium.

The system $(Ba, Sr)TiO_3$-$(Ba,Sr)ZrO_3$ is a mixed-phase system which is structurally modified by the isovalent occupation of the lattice sites. In contrast to the doped materials which aim at heterovalency, substantially larger amounts of substituted atoms (>5-10 atom %) are required for a marked influence.

Thus, in $(Ba,Sr)Ti_{1-y}Me_yO_{3-d}F_z$, substitution of the Ti ions by Zr ions is possible within certain limits without substantially influencing the positive properties of the total doped system.

Accordingly, it is possible according to the invention to replace Ti by not more than 25 atom %, preferably 10%, particularly preferably 5%, but in each case as little as possible, of Zr.

Preferred amounts are from 0.001 to 25, particularly preferably from 0.001 to 12 and in particular from 0.001 to 7 atom % of Zr. It is most preferable to use from 0.001 to 2.5 atom %. The data in atom % are based on the element Ti substituted by Zr.

In one variant, Zr is used in addition to the abovementioned doping elements.

The corresponding alcoholates of barium or strontium serve as a starting point for the sol synthesis via the inverse micelle process.

If they are not commercially available, the Ba and Sr alcoholates can be produced from metals by reaction with dried and distilled alcohol, preferably isopropanol. Suitable further alcohols for the production are for example—but not exclusively—ethanol, n-propanol, 1-butanol, 2-butanol, isobutanol and tert-butanol.

Ti isopropanolate is preferably used as a Ti source. Further possible titanium sources are, for example, Ti alcoholates of 2-butanol, isobutanol and tert-butanol.

Customary alcoholate solvents known in the prior art can be used as solvents for the alcoholates, and dried diphenyl ether is preferably used.

The sol drying route starts from the Ba and Sr acetates and the Ti isopropanolate as starting materials. Further starting compounds which can be used are, for example, titanium(IV) bis(ammoniumlactato) dihydroxide or barium or strontium propionate.

Acetic acid and ethylene glycol can be used as solvents, it also being possible to use the ethylene glycol as an additive to the acetic acid; a preferred solvent is acetic acid (min. 99.8%).

Demineralized water which, in a preferred embodiment, is additionally purified via a Millipore ultrapure water ion exchanger is furthermore used.

$FeNO_3 \cdot 9H_2O$ and trifluoroacetic acid (TFA) are preferably used as doping compounds of the desired doping elements Fe and $F^-$. Iron(III) acetylacetonate, fluoroethanol and ethyl fluoroacetate are furthermore suitable for this purpose.

In the case of the inverse micelle route, a fatty acid (as defined, for example, in Römpp Lexikon Chemie [Römpp Lexicon of Chemistry]) is first added to the alcoholates, which are present in solution in a suitable solvent. In principle, all saturated or unsaturated fatty acids having 8 to 24 carbon atoms are suitable, and fatty acids having 12 to 22, preferably 16 to 20, carbon atoms are preferred. Excess alcohol is distilled off from the sol then resulting and thereafter reaction with hydrogen peroxide is effected. The sol resulting therefrom is then stirred under reflux, preferably for from 24 to 72 hours, particularly preferably for from 40 to 60 hours.

In contrast to the inverse micelle route, in the BST synthesis by means of the sol-gel approach, it is not the pure, hydrolysis-sensitive alcoholates which are used as starting materials but a stoichiometric mixture of the Ba and Sr acetates, and also Ti isopropanolate. Both an undoped and a variably dopable preceramic precursor powder can be obtained from the resulting, aqueous sol.

After synthesis and dilution are complete, the sols can be immediately processed. They are then either converted by means of spray-drying directly into a precursor powder or by means of spray-freeze granulation into frozen granules, which can subsequently be converted into a precursor powder by freeze-drying. Alternatively, the sols are fed to a thin layer method.

The spray drying and the freeze drying are effected by customary, known methods.

In the present invention, screen printing technology is preferably used for the production of ceramic thick BST layers.

The pastes required for this purpose are produced from BST powders synthesized beforehand by the inverse micelle process or preferably the sol drying process.

For this purpose, the powders are mixed at least with
a solvent as a vaporizable vehicle,
a detergent as a dispersing aid, and
a rheology additive for establishing the desired flow behavior of the paste.

Some reagents which are preferably used for this purpose are the following:

| Substance | Manufacturer |
| --- | --- |
| Terpineol | Fluka Chemie AG, Buchs CH |
| Hypermer KD1 | Uniquema, ICI |
| Ethylcellulose "Ethocel", 5-15 mPa · s (80:20 toluene-ethanol solution) | Fluka Chemie AG, Buchs CH |
| Acetone (SupraSolv for gas chromatography) | Merck kGA, Darmstadt |

Preferred screen print pastes in the context of the present invention accordingly contain from 50 to 90, preferably from 70 to 80, % by volume of solvent, from 0.3 to 2.5, preferably from 0.6 to 1.1, % by volume of detergents, from 2.5 to 6, preferably from 4 to 5, % by volume of rheology additives, from 12 to 22, preferably from 15 to 20, particularly preferably from 17 to 18, % by volume of BST powder and from 0 to 10, preferably from 0 to 5, % by volume of other additives, the percentages being chosen so that they sum to 100% by volume, based on the complete screen print paste.

The preparation of the thick layers by means of screen printing in the context of the present invention is effected by procedures customary in the prior art.

It is possible to use any desired screen printing machines; in the present invention, a semiautomatic screen printing machine is preferably used, e.g. EKRA, type M2.

Examples of printing parameters which can be used in the context of the present invention are:

| Printing parameter | Value |
| --- | --- |
| Lift-off | dependent on device and substrate, e.g. from 0.1 to 1 mm |
| Doctor blade speed | from 10 to 50 mm/s, preferably from 25 to 35 mm/s |
| Doctor blade pressure | from 0.3 to 5 bar, preferably from 1.5 to 2.5 bar |
| Doctor blade width approx. | dependent on device and substrate, e.g. from 5 to 15 cm |
| Doctor blade hardness | dependent on device and substrate, e.g. 40-80 Shore |

For example, screens having a stainless steel fabric and a screen angle of from 15 to 30° can be used for printing. Possible fabric finenesses which can be used are, for example, in the range from 100 to 500 mesh/inch with a wire diameter of from 10 to 60 μm and a mesh size of from 30 to 100 μm.

The structuring of the screens can be effected, for example, by a UV-curable photopolymer film (in particular Murakami MS) having a corresponding thickness, preferably from 10 to 50 μm, which is laminated with the screens by a photopolymer emulsion.

The desired structures can thus be produced by means of exposure of photographic transparencies in a screen printing copier (in particular Koenen Variocorp S) and aqueous washing out of the unexposed parts.

In a preferred variant of the method according to the invention, a thermally high pretreatment of the powders and/or sintering of the layers, in particular by means of microwaves, is carried out.

The sintering of the resulting thick layers can be effected in the context of the present invention by well known methods, of which a preferred one is sintering by means of microwaves.

In the present invention, a very wide range of customary closed furnaces, such as, for example, chamber furnaces or tubular furnaces, such as, for example, Heraeus CTF1600, are suitable for sintering.

Suitable sintering temperatures are from 800 to 1600° C., preferably from 900 to 1400° C., particularly preferably from 1100 to 1300° C., and the duration is from 10 minutes to 5 hours, preferably from 30 minutes to 2 hours, particularly preferably from 45 minutes to 1 hour and 15 minutes.

Suitable heating rate and cooling rate are from 1 to 20, preferably from 3 to 10, particularly preferably from 4 to 8, K/min.

Depending on the structure or composition of substrate or screen print paste, respectively, it is necessary to flush the oven with an inert atmosphere during the sintering. Preferred inert atmospheres for this purpose are dried air, dried nitrogen or dried noble gases, particularly helium or argon. As a result, undesired secondary reactions such as, for example, F⁻ losses due to formation of HF with atmospheric water, can be avoided.

The amount of flushing gas passed through is dependent on the furnace size and further parameters of the method but is typically in the range from 0.001 to 10, preferably from 0.01 to 5, particularly preferably from 0.05 to 1 and especially preferably from 0.05 to 0.2 l/min.

However, it is also possible in the present invention deliberately to initiate (secondary) reactions, such as, for example, etching of the substrate or of the dielectric thick layer by means of hydrogen chloride or the like, particularly by passing over carefully selected gases through the furnace. If appropriate, the thick layer may also be partly covered by protective coatings for this purpose.

In addition or alternatively to the sintering method in the chamber or tube furnace, the thick layers can also be sintered by means of microwaves in the present invention.

Typically, furnaces having a built-in microwave source which operate at from 10 to 40 GHz, are used for this purpose.

The incident microwave power is preferably from 1 to 15, preferably from 1 to 12, particularly preferably from 1 to 10 and in particular from 5 to 10 kW.

The heating rate is 30 K/min, the sintering temperature is 1200° C., the holding time is 20 minutes and the cooling rate corresponds to 5 K/min up to 500° C. and the natural cooling rate of the sample isolation system from 500° C. The cooling rate is not more than 20 K/min below 500° C. The atmosphere is ambient air, preferably dry ambient air.

The drying, calcination and/or sintering of the thin layers according to the invention is effected analogously in the same manner.

The substrates used in step 5) of the methods according to the invention and to be coated can, in a preferred embodiment, be covered with a metal layer, preferably comprising aluminum, nickel, palladium, copper, gold, silver and/or platinum, in particular platinum.

The thin and/or thick layers according to the invention or the thin and/or thick layers produced by the methods according to the invention can also be metalized with one or more metal layers in a further step 7).

For example, chromium and/or gold are suitable for this metalization. Gold, which can be used in particular in the form of screen print pastes, is preferred.

In the present invention, metalization can preferably be effected by
 a) screen printing,
 b) vapor deposition,
 c) sputtering,
 d) ion etching or
 e) inkjet printing.

If appropriate, the metalization can also be effected by further printing techniques known from the prior art.

Furthermore, in a variant, the method according to the invention may also comprise the further steps
 8) sintering of the metal layer(s),
 9) application of a commercially available photoresist, e.g. via knife coating or spincoating,
 10) exposure via a photomask and treatment in a commercially available developer bath,
 11) electrodeposition of metal, in particular of silver, gold or platinum,
 12) dissolution of the photoresist and aqueous etching of the initial metalization,
which result in structuring of the coated substrate, e.g. for the production of circuit boards.

A preferred structure which results from the method according to the invention is accordingly
 i) substrate
 ii) metal layer (optional)
 iii) thick BST layer or thin BST layer
 iv) metal layer which may optionally be structured.

The thin and/or thick layers of the present invention have the following properties:

A substantial advantage of the BST according to the invention and of the method according to the invention is that the fluorine is actually a constituent of the BST and is not merely adsorbed on the surface, as was the case in the prior art.

Furthermore, it is advantageous that, in the context of the present invention, the Curie temperature of the ceramic dielectrics can be adjusted in a targeted manner by varying the strontium content. This was neither evident nor to be expected from the prior art to date.

A particular advantage of the iron fluoride-codoped dielectrics according to the present invention is that, as a result of the combined doping, the K factor (i.e. the quality) are very substantially improved, in some cases up to 100 times, below 5 GHz.

Figure 2:
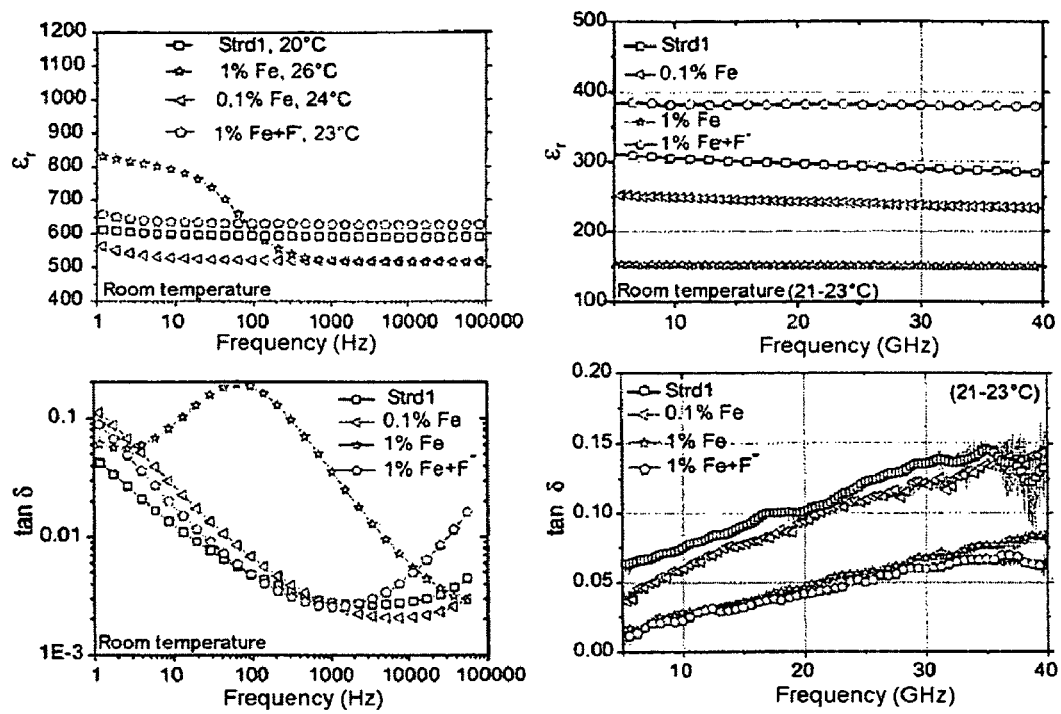
FIG. 2: shows graphs plotting permittivity and dielectric loss against frequency

A further advantage of the iron fluoride-codoped dielectrics is the small losses (tan delta) in the entire GHz range and lower losses at high permittivities (epsilon$_r$) (see FIG. 2).

In FIG. 2:
 epsilon$_r$=permittivity
 tan delta=dielectric loss
 The curves of "Strd1" relate to undoped BST, produced from starting materials having standard purity, and the other curves relate to BST which are doped with corresponding amounts of iron and/or fluorine.

With the method according to the invention, a very wide range of doped and undoped ceramics, but preferably the ceramic dielectrics according to the invention, can be processed in a readily reproducible manner to give thin and/or thick layers. The thin and/or thick layers and multilayer substrates produced by the method according to the invention moreover have good technical properties, such as, for example, resistance and stability.

The method according to the invention leads to a significant increase in the efficiency of thin and/or thick BST layers.

The frequency range which can be used for the dielectrics according to the invention or the thin and/or thick layers resulting therefrom is in the range from 10 kHz to 500 GHz or above, preferably from 100 MHz to 100 GHz, in particular from 100 MHz to 50 GHz or from 100 MHz to 40 GHz.

The dielectric thin and/or thick layers according to the invention can be used as or in coplanar waveguide structures (CPW), IDC structures (interdigital capacitances) or MIM structures (metal insulator metal).

Furthermore, there is a high potential for the use of the undoped or fluoridated, novel thin and/or thick layers in wireless communication (mobile/satellite radio, RFID, point-to-point and point-to-multipoint systems) in a frequency range from 10 kHz to 500 GHz or above, preferably from 100 MHz to 100 GHz, in particular at frequencies below 10 GHz.

In the telecommunications sector, controllable dielectric materials, such as those according to the present invention, are of extremely great interest. The potential quantities of components which contain such layers amount to millions on a worldwide market.

The ceramic dielectrics of the present invention or the thin and/or thick layers according to the invention which contain said dielectrics can be used as or in semiconductors, or capacitors, in particular controllable capacitors, or as a replacement for oscillator crystals.

The ceramic dielectrics of the present invention or the thin and/or thick layers according to the present invention which contain said dielectrics are used in the telecommunications sector, in the area of high-frequency technology and/or in the area of telecommunication.

The ceramic dielectrics of the present invention or the thin and/or thick layers according to the present invention which contain said dielectrics are furthermore used in mobile radio, satellite radio, point-to-multipoint radio systems, tunable RF filters and duplexers, adaptive matching networks or phase shifters, RF sensor systems: RFID Finally, the ceramic dielectrics of the present invention or the thin and/or thick layers according to the present invention which contain said dielectrics can be used in compact electronically controllable and/or non-controllable HF/microwave modules, preferably in Bluetooth® (short wavelength radio transmission), mobile radio and RFID applications, in electronically controllable HF cables and electronically tunable high-frequency filters, and in antennas.

The various developments of the present invention, for example, but not exclusively, those of the various claims, can be combined with one another in any desired manner provided that this is technically expedient.

The invention is now explained with reference to the following nonlimiting examples.

EXAMPLES

Example A

The synthesis of a sol which corresponded to the amount of 20 g of BST by means of the inverse micelle route was effected as follows:

7.725 g (56.25 mmol) of barium metal and 3.286 g (37.50 mmol) of strontium metal in approximately pea-sized pieces were added to a solution of 26.64 g of Ti isopropylate (99.75 mmol) in 500 ml (536.70 g, 2.95 mol) of dried diphenyl ether in a nitrogen-flushed, thermostatable glass reactor. The initially white-colored, colloidal solution was thermostated at 70° C., and 6× the stoichiometric amount (67.61 g, 1.125 mol) of dried isopropyl alcohol were added in the course of 7 days. After 7 days, the metals had dissolved. Approximately 3× the molar amount of the alcoholates (3×93.75 mmol) of oleic acid (cis-9-octadecenoic acid, 79.36 g) was added dropwise to the now honey-colored, colloidal solution. The excess isopropanol was then distilled off at 100° C. and atmospheric pressure. Thereafter, 95.74 g (2.82 mol) of a 30% strength $H_2O_2$ ("Perhydrol") were slowly added dropwise in excess in the course of 50 minutes to the brown sol. After the end of vigorous reaction, the white-yellow ("pastis"-colored) emulsion formed was stirred by reflux at about 90-100° C. for 50 hours. A dark brown sol resulted. This was concentrated directly after production on a rotary evaporator at 80° C. and 145° C. under vacuum from a water jet (5 hPa). First the remaining water and then the solvent diphenyl ether was substantially distilled off. A deep brown, highly viscous precursor sol resulted.

Example B

The production of a sol via the sol-gel route corresponding to the mass of 20 g of BST powder was carried out as follows: 26.648 g of titanium(IV) isopropanolate (93.75 mmol) were added dropwise to a solution of 14.368 g of barium acetate (56.25 mmol) and 8.052 g of strontium acetate (37.50 mmol) in 240.2 g of glacial acetic acid (4 mol) at room temperature in the glass reactor flushed with $N_2$. An exothermic reaction followed, and a slightly viscous, colorless and clear sol formed. 432.4 g of water (Millipore, filtered) were then added rapidly. A likewise colorless and clear sol having a similar viscosity to water formed. This sol obtained in this manner was suitable for further processing both by spray-drying and by freeze-drying.

Example C

For the production of doped BST, the dopants (Fe, Ta) were added either as hydrolysis-sensitive alcoholates or as water-soluble nitrates. The water-sensitive alcoholate of the Ta dopant was added together with the Ti isopropylate at the beginning of the synthesis via volumetric metering of a stock solution of Ta ethoxide in isopropanol (9.015 mg of Ta ethoxide per ml of solution). The water-soluble nitrates were added as an aqueous solution before the dilution with water. The dopants chosen were $Fe^{3+}$ as an acceptor, $Ta^{5+}$ as a donor and $Fe^{3+}$ together with $F^-$ as a mixed acceptor-donor dopant. Iron and tantalum were introduced in two different concentrations as nitrates, and $F^-$ was introduced as trifluoroacetic acid (TFA). The addition of water was necessary in order to permit further processing by freeze-drying.

Example D

The dilute, aqueous sol was spray-dried under nitrogen at a gas temperature of about 125° C. and a gas flow rate of about 38 m3/h. The resulting fine and coarse fractions from the tower and the cyclone were combined after separate investigations of the thermal decomposition. The spray-dryer used was a laboratory spray-dryer from Niro AS Copenhagen, Denmark, having a gas-operated atomizer wheel.

Example E

Here, the aqueous sol was sprayed into liquid nitrogen by means of a gas-operated atomizer ($N_2$-operated binary nozzle). Spray-freeze granules comprising rapidly frozen sol droplets formed. These frozen granules were then freeze-dried on stainless steel plates, which are thermostatable by means of heatable surfaces, in a freeze-dryer (Christ Alpha 1-2) in vacuo at a pressure of not less than 0.1-0.2 Pa ($1 \cdot 10^{-3}$ mbar) in the course of about 100 h. The vacuum chamber of the freeze-dryer comprising acrylic glass had additionally been thermally insulated by a polyethylene bubble film and aluminum foil in order to minimize the heat input into the dried material from the environment.

Between the first 96 h of the freeze-drying process, the temperature of the surfaces was left alone, completely without direct heat input from outside by heating. The temperature trend of the granules in one of the plates was monitored by means of a Pt1000 resistance thermocouple. After 96 h, the granules had a temperature of about 0-10° C. Starting from this temperature, the temperature was then increased manually in vacuo in 3 stages of $2 \times \Delta T=20°$ C. and $1 \times \Delta T=60°$ C. up to 100° C. in order also to remove capillary water. The individual temperature stages (20° C., 40° C., 100° C.) were kept constant for 1 hour each. After heating for one hour at 100° C., the drying chamber was flooded with $N_2$ and allowed to cool under $N_2$ flow for about 5-10 minutes and the resulting white precursor powder was introduced into PE bottles while still hot.

Example F

The corresponding precursors were calcined at 700° C. for 1 h under compressed air flow (15 l/h) in large $Al_2O_3$ ignition boxes in batches of about 4 g each of precursors. The furnace used was a chamber furnace (Carbolite RHF1400) having SiC heating elements. The heating rate was 5 K/min and the cooling rate likewise, as explained, not more than 10 K/min. For variation of the particle size, about 10 g of each batch were calcined again at 900° C. (batch 2) or 1100° C. (batch 3) under the conditions just mentioned.

Example G1

Specifically, the pastes were produced as follows:

Ceramic powders from the spray-drying process could not be deagglomerated with little contamination by means of ultrasound. They were therefore processed further to give screen print pastes only after milling for 6 h in an attritor. For this purpose, the ceramic, agglomerated powder was milled with ethanol as a grinding medium in an attritor (Netzsch) with grinding balls (diameter about 1 mm) and a stirrer mounted on a stainless steel shaft and comprising Mg-stabilized $ZrO_2$ and an $Al_2O_3$ grinding beaker in the course of 7 h while cooling the grinding beaker with water at 600 rpm. The resulting suspension together with grinding balls was concentrated in a rotary evaporator. The granules formed were then completely dried at 120° C. and sieved over a stainless steel sieve having a mesh size of 71 µm in order to separate off the grinding balls. Milled as well as unmilled ceramic powders were stirred into a solution of Hypermer KD1 in terpineol at room temperature by means of a dissolver stirrer. After stirring for about 1 h, the desired amount of ethylcellulose, dissolved in terpineol, was added to this material and stirred once again for 0.5-1 h. The pasty material thus formed was further homogenized by shearing several times on a three-roll mill having ceramic rolls of $Al_2O_3$ (Exakt 50, Koenen). Ready-to-print screen print pastes resulted therefrom.

Example G2

The ceramic powders originating from the freeze-drying process were deagglomerated by means of ultrasound during the paste production. For this purpose, 3-4 g of ceramic powder were suspended in 50 ml of acetone (SupraSolv, Merck) and subjected to ultrasound for 240 minutes with maximum power of the ultrasound disintegrator (Bandelin UW2200 with diamond-coated sonotrode DH13G). This was carried out in an 80 ml rosette vessel comprising borosilicate glass with cooling with water. Toward the end of the ultrasound treatment process, the desired amounts of Hypermer KD1 (dissolved in acetone), terpineol and ethylcellulose (dissolved in acetone) were added in this order to the suspension. This was then freed from acetone on a rotary evaporator at 45° C. and under a vacuum from a water jet and was concentrated to a pasty consistency. The resulting raw paste was then passed several times over a three-roll mill until the odor of acetone was no longer perceptible.

Example H

Example of a Paste Composition Which can be Used According to the Invention

| Constituent | Function | Volume fraction |
| --- | --- | --- |
| Terpineol | Solvent | 77.9% by volume |
| Hypermer KD1 | Detergent | 0.9% by volume |
| Ethylcellulose | Rheology additive | 4.4% by volume |
| BST powder | Solid | 17.1% by volume |

This paste composition shows optimized properties with regard to printing behavior and the porosity of the thick layers resulting therefrom.

Example J

The screen printing unit used for printing the thick layers was a semiautomatic screen printing machine (EKRA, type M2). The printing parameters used here are:

| Printing parameter | Value |
| --- | --- |
| Lift-off | 0.5 mm |
| Doctor blade speed | 30 mm/s |
| Doctor blade pressure | 2 bar |
| Doctor blade width approx. | 10 cm |
| Doctor blade hardness | 60 Shore |

Screens comprising stainless steel fabric and having a screen angle of 22.5° were used for printing. The fabric finenesses used were 325, 250 and 200 mesh/inch with a wire diameter of 24, 36 and 40 µm, respectively, and a mesh size of 53, 63 and 90 µm, respectively.

The structuring of the screens was effected by a UV-curable photopolymer film (Murakami MS) having a thickness of 30 µm, which was laminated onto the screens by a photopolymer emulsion. By exposure of transparencies in a screen printing copier (Koenen Variocorp S) and aqueous washing out of the unexposed parts, the desired structures were produced. In each case printing was effected after flooding of the screen with the corresponding paste by a preceding "dummy print", which was discarded.

Example K1

For measurement of the low frequency properties (LF properties), capacitor structures were applied by means of screen printing to polycrystalline $Al_2O_3$ substrates (50.8× 50.8 mm, thickness=635 µm±50 µm; Rubalit 710, CeramTec AG, Marktredwitz) having a density of ≧99.6% of the theoretical density. Prior to imprinting, these $Al_2O_3$ substrates had been divided on the back by means of laser structuring into 18 equal, rectangular fields bounded by predetermined breaking indentations and having a size of about 8.3 mm×16.7 mm. The laser-generated predetermined breaking indentations served for isolating the capacitor structures produced, in order to make them capable of being handled for the dielectric measurements. Prior to application of the dielectric thick layer to the individual substrate fields, however, rectangular thick Pt layers (about 5 mm×8 mm) were printed on the substrate as bottom electrodes by means of screen printing and were sintered. This was done twice in succession. The sintering temperature was 1300° C. during a holding time of 10 minutes at a heating rate of 5 K/min under air.

The BST layer was printed as a strip (5 mm×8 mm) rotated through 90° through a 250 mesh screen on these Pt electrodes produced in this manner. Directly after the printing process, the layers were introduced into a saturated acetone atmosphere for leveling at room temperature for about 20 s and then covered and allowed to rest for at least 15 minutes for further leveling. The covered layers were then dried in a Petri dish for at least 8 h at 60° C. in a circulation drying oven (Heraeus UT6). After the drying, the printing and drying process was repeated once again in order to achieve a sufficient layer thickness for high dielectric strength of the thick-layer capacitors. The dried thick layers were then compacted by a cold isostatic method at 400 MPa. For this purpose, household aluminum foil was placed as a nonadhesive separating layer between the unsintered thick layer to be compacted and the polyethylene welding film for the pressing process.

Example K2

For determining the high frequency properties (HF properties) of the thick BST layers, BST layers continuous over the entire substrate and printed on once were produced. They were printed on the same $Al_2O_3$ substrates as the abovementioned layers of the capacitor structures for the LF measurements but without laser-generated predetermined breaking indentations. For variation of the layer thickness, they were printed once through 325, 250 and 200 mesh/inch screens. After the printing, they were likewise brought, like the printed capacitor structures, for about 20 s into a saturated acetone atmosphere, then left to stand for at least 15 minutes for leveling and then dried in a closed Petri dish for at least 8 h in a circulation oven at 60° C. The dried layers were then likewise subsequently compacted via a cold isostatic method at 400 MPa, with aluminum foil as an antiadhesion layer between BST layer and PE welding film.

Example L

Both the thick BST layers printed with Pt electrodes on laser-generated $Al_2O_3$ substrates and the thick BST layers printed continuously on unstructured $Al_2O_3$ substrates were sintered in the standard manner in a chamber furnace (Linn VMK1400) at 1200° C. for 1 h under air. The heating and cooling rate was 5 K/min.

An exception here was the fluoridated layers. They were sintered with an identical heating profile but in a closed tubular furnace (Heraeus CT-F1600) which was flushed with synthetic air dried over $P_2O_5$ (about 100 ml/min). This was intended to avoid $F^-$ losses through formation of HF with atmospheric water.

In addition to the sintering process in the chamber or tubular furnace, thick layers were sintered by means of microwaves. For this purpose, an oven having a 30 GHz gyrotron microwave source from IHM (Institut für Hochleistungsimpuls und Mikrowellentechnik [Institute for High-power pulse and microwave technology]) at the Karlsruhe Research Center was used. Here, the incident microwave power (max. 10 kW) was regulated by a control computer to which thermocouples which were present in direct contact with the substrate of the thick layer to be sintered were connected for temperature monitoring. The power control was carried out in the continuous wave mode. The samples were placed horizontally between two porous $ZrO_2$ plates, which in turn were embedded in mullite fiber plates. The $ZrO_2$ plates served as indirect heaters (susceptors) in order to minimize heat losses at temperature gradients of the sample through radiation. The border comprising mullite fiber plates served for thermal insulation.

The heating rate was 30 K/min, the sintering temperature 1200° C. and the holding time 20 minutes, and the cooling rate corresponded to 5 K/min up to 500° C. and the natural cooling rate of the sample insulation system from 500° C. The cooling rate was not more than 20 K/min below 500° C. The atmosphere was ambient air.

Example M

A thick gold layer (about 4 mm×7 mm) was then additionally applied as the top electrode to the sintered Pt BST layers. For this purpose, a commercial gold paste was printed centrally onto the BST layer likewise by screen printing. This was sintered after drying in a chamber furnace (Linn VMK1400) under ambient air for 10 min at 830° C. with a heating and cooling rate of 5 K/min.

The fluoridated layers were sintered using an identical heating profile but, as described above, in a closed tubular furnace under dried synthetic air.

Example N

A 20 nm thick layer of Cr and a 50 nm thick layer of gold were first applied thermally by vapor deposition as initial metalization. A positive photoresist (AZ 4562; MicroChemicals GmbH, Ulm) was applied thereon by spincoating, exposed to UV light via a photomask (negative) and then washed out in a developer bath (AZ 400k; MicroChemicals GmbH, Ulm) so that only those parts of the starter layer which were to be coated were accessible. These parts of the initial metalization which were bared by the development were now enhanced in a gold salt bath (Puramed 40×) by an electroplating method to a layer thickness of about 2.5-3 µm. After the electrodeposition, the photoresist was dissolved out of the structure by means of acetone. The initial metalization of chromium and gold, which was thin compared with the electrodeposited gold layer, was now removed by means of a gold etching solution (aqueous iodine/potassium iodide solution) and etching for 10-15 seconds with a chromium etching solution (ammonium cerium(IV) nitrate solution in nitric acid). The structure was then washed with distilled water.

Example O

Use Example

For realizing controllable capacitors for high frequency technology, interdigital capacitors were structured on thick BST layers.

By applying a control voltage between the fingers of the interdigital capacitor, an electric control field formed in the BST layer.

This control field reduced the permittivity of the dielectric. The reduction in the permittivity reduced the capacitance of the capacitor controllable in this manner.

The invention claimed is:
1. A ceramic dielectric having the formula $Ba_{1-x}Sr_xTi_{1-y}Me_yO_{3-z}F_z$ wherein
x=0.0001 to 1, and
y=0.0001 to 0.2, and
z=0.00001 to 3,
comprising one or more of the metals selected from the group consisting of Fe, Co, Mn, Ni, Cu, Mg, Cr, Zn, Cd, Ag, Y, Sc, Al, Ga, In, As, Sb, Pt, Zr and Au as doping metal Me.
2. The ceramic dielectric as claimed in claim 1, wherein at least one of Fe, Co, Mn, Ni, Cu, Mg and Cr, is the doping metal Me.
3. The ceramic dielectric as claimed in claim 1, wherein Zr is metal Me, alternatively to said metals or additionally to said metals.
4. The ceramic dielectric as claimed in claim 1, wherein the dielectric corresponds to the formula $Ba_{0.6}Sr_{0.4}Ti_{0.99}Fe_{0.01}O_{3-z}F_z$, where z is from 0.001 to 0.2.

5. The ceramic dielectric as claimed in claim 1 for thin and/or thick layer systems, the ceramic dielectric having the formula $Ba_{1-x}Sr_xTi_{1-y}Me_yO_{3-z}F_z$ wherein
x=0.0001 to 1, and
Y=0.0001 to 0.2, and
Z=0.00001 to 3,
comprising one or more of the metals selected from the group consisting of Fe, Co, Mn, Ni, Cu, Mg, Cr, Zn, Cd, Ag, Y, Sc, Al, Ga, In, As, Sb, Pt and Au as doping metal Me.

6. The ceramic dielectric as claimed in claim 1 for controllable HF/microwave applications, the ceramic dielectric having the formula $Ba_{1-x}Sr_xTi_{1-y}Me_yO_{3-z}F_z$ wherein
x=0.0001 to 1, and
y=0.0001 to 0.2, and
z=0.00001 to 3,
comprising one or more of the metals selected from the group consisting of Fe, Co, Mn, Ni, Cu, Mg, Cr, Zn, Cd, Ag, Y, Sc, Al, Ga, In, As, Sb, Pt and Au as doping metal Me.

7. The ceramic dielectric as claimed in claim 5 for use as electronically controllable functional layers in the frequency range from 10 kHz to 500 GHz or above, preferably from 100 MHz to 100 GHz, particularly preferably 100 MHz and 50 GHz or from 100 MHz to 40 GHz.

8. The ceramic dielectric as claimed in claim 7, wherein said layers are screen-printed thick layers.

9. The ceramic dielectric as claimed in claim 8, wherein the thick layers produced are finely divided with particle sizes in the range from 20 to 1000 nm.

10. A method for producing screen-printed thick layers, comprising multilayer structures the method comprising,
1) producing a sol,
2) producing a precursor via
   a1) an inverse micelle route or
   a2) a sol-gel route,
   b) drying of the sol,
3) producing a ceramic powder by calcination of the precursor,
3).1 selective ultrasonic deagglomeration or milling of the ceramic powder,
4) producing a screen print paste by mixing of constituents of steps 1)-3),
5) application of the screen print paste to a substrate by means of screen printing to form thin or thick layers,
6) sintering of the thin or thick layers, the screen-printed thin or thick layers comprising at least one ceramic dielectric having the formula $Ba_{1-x}Sr_xTi_{1-y}Me_yO_{3-z}F_z$ wherein
x=0.0001 to 1, and
y=0.0001 to 0.2, and
z=0.00001 to 3, comprising one or more of the metals selected from the group consisting of Fe, Co, Mn, Ni, Cu, Mg, Cr, Zn, Cd, Ag, Y, Sc, Al, Ga, In, As, Sb, Pt and Au as doping metal Me.

11. A method for producing CSD thin layers having multilayer structures the method comprising,
producing a sol,
applying the sol to a substrate as layers by
a) dipcoating,
b) spincoating or
c) inkjet printing and
drying, calcinating and/or sintering the applied layers, the thin layers comprising at least one ceramic dielectric having the formula $Ba_{1-x}Sr_xTi_{1-y}Me_yO_{3-z}F_z$ wherein
x=0.0001 to 1, and
y=0.0001 to 0.2, and
z=0.00001 to 3, comprising one or more of the metals selected from the group consisting of Fe, Co, Mn, Ni, Cu, Mg, Cr, Zn, Cd, Ag, Y, Sc, Al, Ga, In, As, Sb, Pt and Au as doping metal Me.

12. The method as claimed in claim 10, wherein the thin or thick layers are thin or thick layers, for use as electronically controllable functional layers and the at least one ceramic dielectric is a ceramic dielectric having the formula $Ba_{1-x}Sr_xTi_{1-y}Me_yO_{3-z}F_z$ wherein
x=0.0001 to 1, and
y=0.0001 to 0.2, and
z=0.00001 to 3, comprising one or more of the metals selected from the group consisting of Fe, Co, Mn, Ni, Cu, Mg, Cr, Zn, Cd, Ag, Y, Sc, Al, Ga, In, As, Sb, Pt and Au as doping metal Me.

13. The method as claimed in claim 10, wherein the sintering is effected by high-temperature sintering or by microwave sintering or a combination of high-temperature sintering and microwave sintering.

14. The method as claimed in claim 10, wherein the substrate in step 5) is covered with a metal layer, preferably comprising aluminum, nickel, palladium, copper, gold, silver and/or platinum, in particular platinum.

15. The method as claimed in claim 10, wherein the thin or thick layers are metalized in a further step.

16. The method as claimed in claim 15, comprising metalizing the thin or thick layers with chromium and/or gold.

17. The method as claimed in claim 16, wherein the metallization is effected by
a) screen printing,
b) vapor deposition,
c) sputtering,
d) ion etching or
e) inkjet printing.

18. The ceramic dielectric as claimed in claim 1 comprising screen-printed thin and/or thick layers, for use as electronically controllable functional layers in the telecommunications sector, in the area of high frequency technology and/or in the area of telecommunications.

19. The ceramic dielectric as claimed in claim 1 comprising screen-printed thin and/or thick layers, for use as electronically controllable functional layers in mobile radio, satellite radio, point-to-multipoint radio systems, tunable RF filters and duplexers, adaptive matching networks or phase shifters, RF sensor systems, such as, for example, RFID.

20. The ceramic dielectric as claimed in claim 1 comprising screen-printed thick layers, for use as electronically controllable functional layers in compact electronically controllable and/or non-controllable HF/microwave modules, preferably in short wavelength radio transmission, mobile radio and RFID applications, in electronically controlled HF cables and electronically tunable high frequency filters, and in antennas.

21. The ceramic dielectric as claimed in claim 1, wherein
x=0.2 to 0.6,
y=0.001 to 0.05,
z=0.001 to 0.2.

* * * * *